(12) United States Patent
Yang

(10) Patent No.: US 8,791,639 B2
(45) Date of Patent: Jul. 29, 2014

(54) SOLID-STATE LIGHT EMITTING DEVICE HAVING CONTROLLABLE MULTIPHASE REACTIVE POWER

(76) Inventor: Tai-Her Yang, Dzan-Hwa (TW)

( * ) Notice: Subject to any disclaimer, the term of this patent is extended or adjusted under 35 U.S.C. 154(b) by 469 days.

(21) Appl. No.: 13/226,625

(22) Filed: Sep. 7, 2011

(65) Prior Publication Data

US 2012/0256547 A1    Oct. 11, 2012

Related U.S. Application Data

(63) Continuation-in-part of application No. 13/080,782, filed on Apr. 6, 2011, now Pat. No. 8,513,890.

(51) Int. Cl.
*H05B 41/16* (2006.01)
*H05B 41/24* (2006.01)

(52) U.S. Cl.
USPC .............................. 315/144; 315/137; 315/139

(58) Field of Classification Search
None
See application file for complete search history.

(56) References Cited

U.S. PATENT DOCUMENTS 8,513,890 B2 *   8/2013   Yang ............................. 315/144

* cited by examiner

*Primary Examiner* — Anh Tran
(74) *Attorney, Agent, or Firm* — Bacon & Thomas, PLLC

(57) ABSTRACT

The present invention utilizes a three-phase or multiphase AC power source, and the electric power of each phase respectively drives its corresponding solid-state light emitting member, and the solid-state light emitting members respectively driven by each phase power are arranged adjacently or arranged with an overlapping means, so that the light of the individual solid-state light emitting members respectively driven by the multiphase power source and arranged adjacently or arranged with an overlapping means can reduce the brightness pulse through synthetic illumination; and through being controlled by a solid-state switch device for controlling AC conductivity phase angle (1000) installed on the power source of each phase, when the illumination brightness of corresponding solid-state light emitting member is lower than that of other solid-state light emitting members arranged adjacently or arranged with an overlapping means, the power source is cut for saving energy.

4 Claims, 4 Drawing Sheets

SOLID-STATE LIGHT EMITTING DEVICE HAVING CONTROLLABLE MULTIPHASE REACTIVE POWER

CROSS-REFERENCE TO RELATED APPLICATION

This application is a Continuation-In-Part of my patent application Ser. No. 13/080,782, filed on Apr. 6, 2011 now U.S. Pat. No. 8,513,890.

BACKGROUND OF THE INVENTION (a) Field of the Invention

The present invention utilizes a three-phase or multiphase AC power source, and the electric power of each phase respectively drives its corresponding solid-state light emitting member, and the solid-state light emitting members respectively driven by each phase power are arranged adjacently or arranged with an overlapping means, so that the light of the individual solid-state light emitting members respectively driven by the multiphase power source and arranged adjacently or arranged with an overlapping means can reduce the brightness pulse through synthetic illumination; and through being controlled by a solid-state switch device for controlling AC conductivity phase angle (1000) installed on the power source of each phase, when the illumination brightness of corresponding solid-state light emitting member is lower than that of other solid-state light emitting members arranged adjacently or arranged with an overlapping means, the power source is cut for saving energy.

(b) Description of the Prior Art

One primary disadvantage of the conventional single phase AC power lamp is that the illumination brightness of the driven solid-state light emitting member is in a pulse state due to the voltage pulse of the AC power source; and in a multiphase AC power source, each phase power respectively drives individual solid-state light emitting member, because each phase power belongs to different phase, the peak values of different phase voltages are different at the same temporary time period, thereby the individual solid-state light emitting members respectively driven by each phase power generate the optical energy with different brightness for achieving a synthetic illumination, so the brightness pulse is reduced, wherein the driving power of the solid-state light emitting member with lower brightness would be formed as reactive power.

SUMMARY OF THE INVENTION

The present invention utilizes a three-phase or multiphase AC power source, and each phase power respectively drives individual solid-state light emitting members arranged adjacently or arranged with an overlapping means, so that the synthetic illumination brightness is overlapped through the illumination brightness waveforms generated by the AC power voltage of each phase, thereby the synthetic pulse rate of illumination brightness can be lowered, and the sine waveform voltages at different phases between each power source enable the individual solid-state light emitting members respectively driven by each phase power and arranged adjacently or arranged with an overlapping means generate the optical energy having different brightness with respect to the instant value of the voltage waveform. When the individual solid-state light emitting members having different brightness and arranged adjacently or arranged with an overlapping means emit light, the power passing through the individual solid-state light emitting member having a relatively low brightness is defined as reactive power. The solid-state light emitting device having controllable multiphase reactive power, provided by the present invention, utilizes a solid-state switch device for controlling AC conductivity phase angle (1000) for controlling the reactive power to be cut so as to save power, and to further regulate the current and voltage supplied to the individual solid-state light emitting member.

DESCRIPTION OF MAIN COMPONENT SYMBOLS (101), (102), (103): Solid-state light emitting member
(1000): Solid-state switch device for controlling AC conductivity phase angle (2000): Solid-state switch device for controlling electric conduction phase angle (BR100): Single-phase bridge rectifier (Va)、(Vb)、(Vc): Voltage waveform of the three-phase AC power source respectively driving individual solid-state light emitting members arranged adjacently or arranged with an overlapping means (Ia)、(Ib)、(Ic): Current waveform of the three-phase AC power source respectively driving individual solid-state light emitting members arranged adjacently or arranged with an overlapping means (e): Synthetic light waveform of the three-phase AC power source respectively driving individual solid-state light emitting members arranged adjacently or arranged with an overlapping means (Vda)、(Vdb)、(Vdc): Voltage waveform of the three-phase AC power source being regulated by the solid-state switch device for controlling AC conductivity phase angle (1000) then respectively driving individual solid-state light emitting members arranged adjacently or arranged with an overlapping means (Ida)、(Idb)、(Idc): Current waveform of the three-phase AC power source being regulated by the solid-state switch device for controlling AC conductivity phase angle (1000) then respectively driving individual solid-state light emitting members arranged adjacently or arranged with an overlapping means (de): Synthetic light waveform of the three-phase AC power source being regulated by the solid-state switch device for controlling AC conductivity phase angle (1000) then respectively driving individual solid-state light emitting members arranged adjacently or arranged with an overlapping means (COM): Common connection end (ECU): Electric power control unit (N): Neutral wire of three-phase four-wire AC power source (R)、(S)、(T): Three-phase AC power wire (Z10): AC current limiting circuit device

DETAILED DESCRIPTION OF THE PREFERRED EMBODIMENTS

Figure 1:
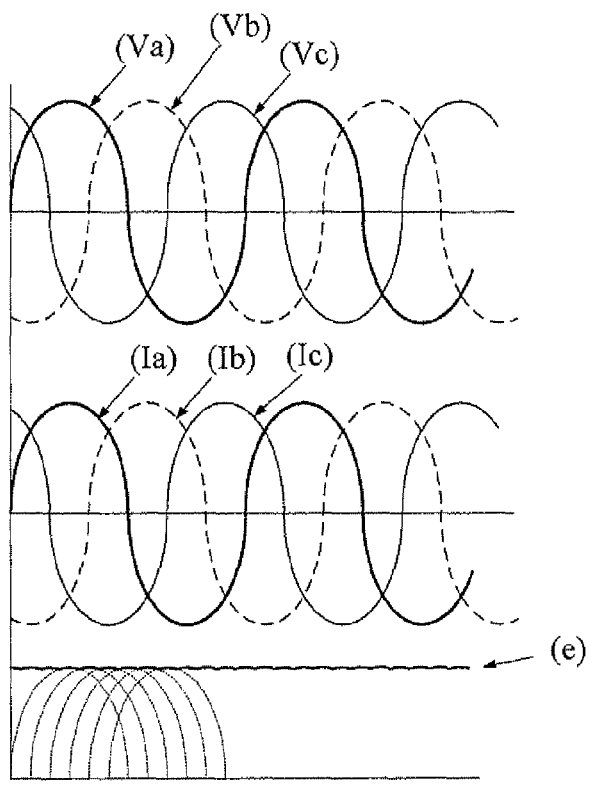
FIG. 1 is a synthetic illumination pulse waveform and current waveform showing utilizing a three-phase AC power source and each phase power respectively driving individual solid-state light emitting members arranged adjacently or arranged with an overlapping means.

One primary disadvantage of the conventional single phase AC power lamp is that the illumination brightness of the driven solid-state light emitting member is in a pulse state due to the voltage pulse of the AC power source; and in a multiphase AC power source, each phase power respectively drives individual solid-state light emitting member, because each phase power belongs to different phase, the peak values of different phase voltages are different at the same temporary time period, thereby the individual solid-state light emitting members respectively driven by each phase power generate the optical energy with different brightness for achieving a synthetic illumination, so the brightness pulse is reduced, wherein the driving power of the solid-state light emitting member with lower brightness would be formed as reactive power;

FIG. 1 is a synthetic illumination pulse waveform and current waveform showing utilizing a three-phase AC power source and each phase power respectively driving individual solid-state light emitting members arranged adjacently or arranged with an overlapping means.

As shown in FIG. 1, wherein:

(Va), (Vb) and (Ye) are voltage waveforms of the three-phase AC power source respectively driving individual solid-state light emitting members arranged adjacently or arranged with an overlapping means;

(Ia), (Ib) and (Ic) are current waveforms of the three-phase AC power source respectively driving individual solid-state light emitting members arranged adjacently or arranged with an overlapping means;

(e) is a synthetic illumination waveform of the three-phase AC power source respectively driving individual solid-state light emitting members arranged adjacently or arranged with an overlapping means;

The present invention utilizes a three-phase or multiphase AC power source, and each phase power respectively drives individual solid-state light emitting members arranged adjacently or arranged with an overlapping means, so that the synthetic illumination brightness is overlapped through the illumination brightness waveforms generated by the AC power voltage of each phase, thereby synthetic pulse rate of illumination brightness can be lowered, and the sine waveform voltage at different phase between each power source enables the individual solid-state light emitting members respectively driven by each phase power and arranged adjacently or arranged with an overlapping means generate the optical energy having different brightness with respect to the instant value of the voltage waveform. When the individual solid-state light emitting members having different brightness and arranged adjacently or arranged with an overlapping means emit light, the power passing through the individual solid-state light emitting member having a relatively low brightness is defined as reactive power. The solid-state light emitting device having controllable multiphase reactive power, provided by the present invention, utilizes a solid-state switch device for controlling AC conductivity phase angle (1000) for controlling the reactive power to be cut so as to save power, and to further regulate the current and voltage supplied to the individual solid-state light emitting member.

Figure 2:
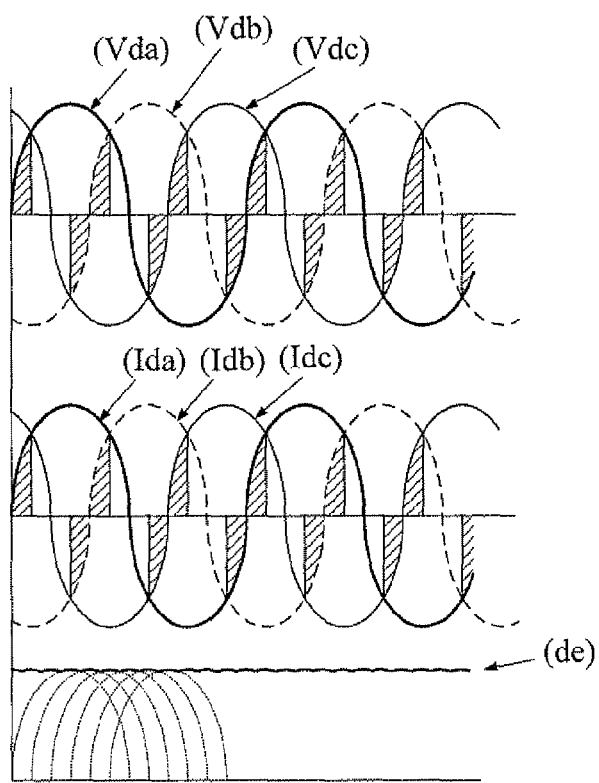
FIG. 2 is a synthetic illumination pulse waveform and current waveform showing utilizing the three-phase AC power source and each phase power being regulated by the solid-state switch device for controlling AC conductivity phase angle (1000) then respectively driving individual solid-state light emitting members arranged adjacently or arranged with an overlapping means.

The solid-state light emitting device having controllable multiphase reactive power adopts a three-phase AC power source, and the electric power of each phase respectively drives individual solid-state light emitting members arranged adjacently or arranged with an overlapping means for synthetic illumination, so that the pulse of illumination brightness is reduced, and a solid-state switch device for controlling AC conductivity phase angle (1000) is connected in series with each phase for saving reactive power, and the current and voltage supplied to the individual solid-state light emitting member can be further regulated;

FIG. 2 is a synthetic illumination pulse waveform and current waveform showing utilizing the three-phase AC power source and each phase power being regulated by the solid-state switch device for controlling AC conductivity phase angle (1000) then respectively driving individual solid-state light emitting members arranged adjacently or arranged with an overlapping means.

Figure 3:
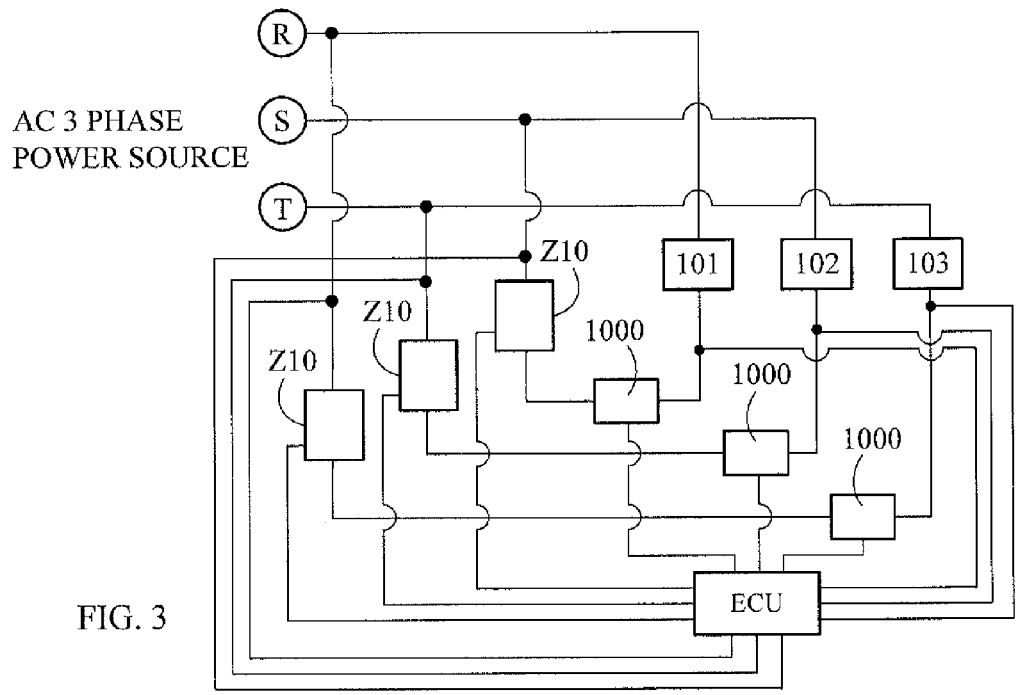
FIG. 3 is a circuit schematic view of utilizing the three-phase AC power source and each phase power being regulated by the solid-state switch device for controlling AC conductivity phase angle (1000) then respectively driving individual solid-state light emitting members connected in a Delta (Δ) format and arranged adjacently or arranged with an overlapping means.

As shown in FIG. 2, wherein:

(Vda), (Vdb) and (Vdc) are voltage waveforms of the three-phase AC power source being regulated by the solid-state switch device for controlling AC conductivity phase angle (1000) then respectively driving individual solid-state light emitting members arranged adjacently or arranged with an overlapping means;

(Ida), (Idb) and (Idc) are current waveforms of the three-phase AC power source being regulated by the solid-state switch device for controlling AC conductivity phase angle (1000) then respectively driving individual solid-state light emitting members arranged adjacently or arranged with an overlapping means;

(de) is a synthetic illumination waveform of the three-phase AC power source being regulated by the solid-state switch device for controlling AC conductivity phase angle (1000) then respectively driving individual solid-state light emitting members arranged adjacently or arranged with an overlapping means;

FIG. 3 is a circuit schematic view of utilizing the three-phase AC power source and each phase power being regulated by the solid-state switch device for controlling AC conductivity phase angle (1000) then respectively driving individual solid-state light emitting members connected in a Delta (Δ) format and arranged adjacently or arranged with an overlapping means; as shown in FIG. 3, it mainly consists of:

AC solid-state light emitting member (101), (102), (103): constituted by two or more than two AC-power driven solid-state light emitting members, including a light emitting diode (LED) or an organic light emitting diode (OLED) provided as a foundational light emitting member for being driven by AC power source, or including other solid-state light emitting member capable of being driven by AC power source;

The AC-power driven solid-state light emitting member (102) is connected in series with the AC current limiting circuit device (Z10) and connected in series with the solid-state switch device for controlling AC conductivity phase angle (1000), then connected in parallel between the three-phase AC power wire (S) and the three-phase AC power wire (T);

The AC-power driven solid-state light emitting member (103) is connected in series with the AC current limiting circuit device (Z10) and connected in series with the solid-state switch device for controlling AC conductivity phase angle (1000), then connected in parallel between the three-phase AC power wire (T) and the three-phase AC power wire (R);

AC current limiting circuit device (Z10): constituted by one or more than one of the following circuit structures, including:

1) Regulating the driving current of the AC solid-state light emitting member (LED) by increasing/decreasing the reactive power conductivity angle controlled by the solid-state switch device for controlling AC conductivity phase angle (1000);

2) One or more than one of resistant type impedance member, induction type impedance member or capacitor type impedance member being connected in series, in parallel or in series and parallel;

3) The control circuit structured by a solid-state semiconductor circuit which performs analog or chopper type constant current or limiting current to the solid-state light emitting member;

4) AC stabilizing transformer;

5) AC constant current output transformer;

Solid-state switch device for controlling AC conductivity phase angle (1000): constituted by one or more than one of the following circuit structures:

1) A thyristor power component capable of controlling conductivity phase angle, for example TRIAC (Tri-Electrode AC Switch), SCR (Silicon Controlled Rectifier) or GTO (Gate Turn-off Thyristor) serving as an active component, and through the operations of the voltage comparison circuit between each phase voltage from the each phase voltage detection circuit, the control timing of both or at least one of the turn-on phase angle and the turn-off phase angle of the thyristor component is enabled to be controlled;

2) A solid-state switch device composed of a filed effect power component, for example MOSFET (Metal Oxide Semiconductor Field Effect Transistor) or IGBT (Insulated Gate Bipolar Transistor) serving as the active component, and through the operations of the voltage comparison circuit between each phase voltage from the voltage detection circuit of multiphase power source, the driving circuit of the field effect component is controlled, so as to control the control timing of both or at least one of the turn-on phase angle and the turn-off phase angle of the field effect component;

3) With properties of the zener voltage of the zener diode, or with the voltage forward drop feature of the diode, the zener diode or the diode is connected in series between the gate of the thyristor and the voltage source, so as to set the control timing of both or at least one of the turn-on phase angle and the turn-off phase angle of the thyristor component during the power source performing the voltage variation in a sine waveform;

4) Through the voltage of the used AC power source, to set the operations of the turn-on phase angle and the turn-off phase angle of the solid-state light emitting member according to the voltage forward (VF) feature of the AC solid-state light emitting member itself (LED), during the power source performing the voltage variation in a sine waveform;

Electric power control unit (ECU): according to the internal setting of the electric control unit (ECU) or receiving external controls, and referring to the voltage of power source and the current passing through the AC current limiting circuit device (Z10), for controlling the turn-on phase angle of the solid-state switch device for controlling AC conductivity phase angle (1000) is controlled, so as to regulate the voltage and current passing through the solid-state light emitting member;

The illumination waveform and current waveform diagrams obtained during the operation disclosed in the embodiment illustrated in FIG. 3 are the same as what is disclosed in FIG. 2.

Figure 4:
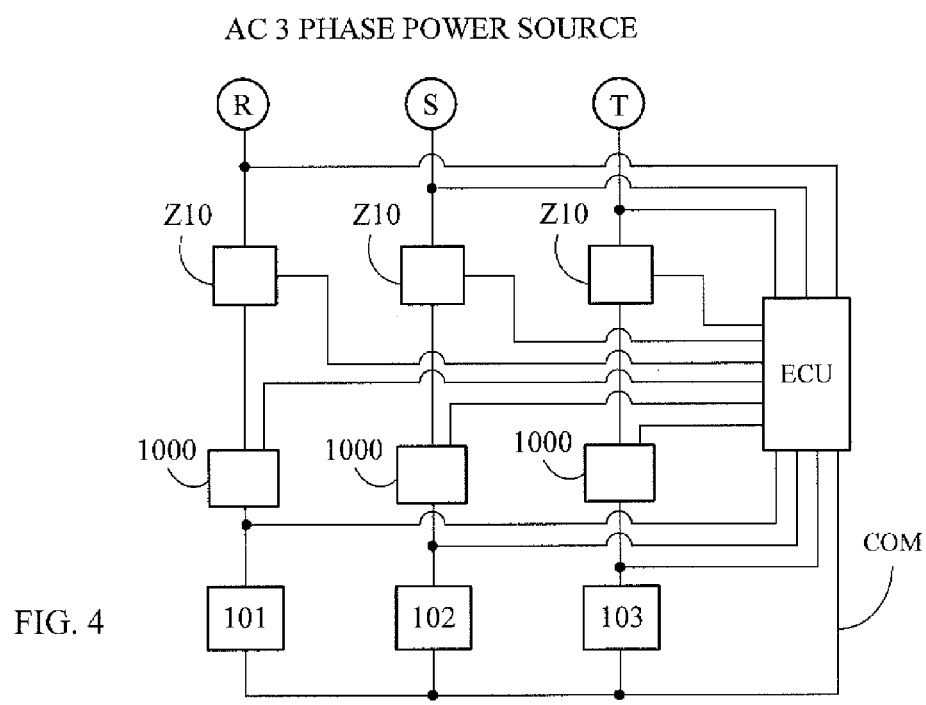
FIG. 4 is a circuit schematic view of utilizing the three-phase AC power source and each phase power being regulated by the solid-state switch device for controlling AC conductivity phase angle (1000) then respectively driving individual solid-state light emitting members connected in an Wye (Y) format and arranged adjacently or arranged with an overlapping means.

FIG. 4 is a circuit schematic view of utilizing the three-phase AC power source and each phase power being regulated by the solid-state switch device for controlling AC conductivity phase angle (1000) then respectively driving individual solid-state light emitting members connected in an Wye (Y) format and arranged adjacently or arranged with an overlapping means; as shown in FIG. 4, it mainly consists of:

AC solid-state light emitting member (101), (102), (103): constituted by two or more than two AC-power driven solid-state light emitting members, including a light emitting diode (LED) or an organic light emitting diode (OLED) provided as a foundational light emitting member for being driven by AC power source, or including other solid-state light emitting member capable of being driven by AC power source;

The AC-power driven solid-state light emitting member (101), the AC-power driven solid-state light emitting member (102) and the AC-power driven solid-state light emitting member (103) are connected in the Wye (Y) format at the common connection end (COM);

The non-common connection end of the AC-power driven solid-state light emitting member (101) is connected in series with the AC current limiting circuit device (Z10) and connected in series with the solid-state switch device for controlling AC conductivity phase angle (1000), and after the series connection, one end thereof is connected to the three-phase AC power wire (R);

The non-common connection end of the AC-power driven solid-state light emitting member (102) is connected in series with the AC current limiting circuit device (Z10) and connected in series with the solid-state switch device for controlling AC conductivity phase angle (1000), and after the series connection, one end thereof is connected to the three-phase AC power wire (S);

The non-common connection end of the AC-power driven solid-state light emitting member (103) is connected in series with the AC current limiting circuit device (Z10) and connected in series with the solid-state switch device for controlling AC conductivity phase angle (1000), and after the series connection, one end thereof is connected to the three-phase AC power wire (T);

AC current limiting circuit device (Z10): constituted by one or more than one of the following circuit structures, including:

1) Regulating the driving current of the AC solid-state light emitting member (LED) by increasing/decreasing the reactive power conductivity angle controlled by the solid-state switch device for controlling AC conductivity phase angle (1000);

2) One or more than one of resistant type impedance member, induction type impedance member or capacitor type impedance member being connected in series, in parallel or in series and parallel;

3) The control circuit structured by a solid-state semiconductor circuit which performs analog or chopper type constant current or limiting current to the solid-state light emitting member;

4) AC stabilizing transformer;

5) AC constant current output transformer;

Solid-state switch device for controlling AC conductivity phase angle (1000): constituted by one or more than one of the following circuit structures:

1) A thyristor power component capable of controlling conductivity phase angle, for example TRIAC (Tri-Electrode AC Switch), SCR (Silicon Controlled Rectifier) or GTO (Gate Turn-off Thyristor) serving as an active component, and through the operations of the voltage comparison circuit between each phase voltage from the each phase voltage detection circuit, the control timing of both or at least one of the turn-on phase angle and the turn-off phase angle of the thyristor component is enabled to be controlled;

2) A solid-state switch device composed of a filed effect power component, for example MOSFET (Metal Oxide Semiconductor Field Effect Transistor) or IGBT (Insulated Gate Bipolar Transistor) serving as the active component, and through the operations of the voltage comparison circuit between each phase voltage from the voltage detection circuit of multiphase power source, the driving circuit of the field effect component is controlled, so as to control the control timing of both or at least one of the turn-on phase angle and the turn-off phase angle of the field effect component 3) With properties of the zener voltage of the zener diode, or with the voltage forward drop feature of the diode, the zener diode or the diode is connected in series between the gate of the thyristor and the voltage source, so as to set the control timing of both or at least one of the turn-on phase angle and the turn-off phase angle of the thyristor component during the power source performing the voltage variation in a sine waveform;

4) Through the voltage of the used AC power source, to set the operations of the turn-on phase angle and the turn-off phase angle of the solid-state light emitting member according to the voltage forward (VF) feature of the AC solid-state light emitting member itself (LED), during the power source performing the voltage variation in a sine waveform;

Electric power control unit (ECU): according to the internal setting of the electric control unit (ECU) or receiving external controls, and referring to the voltage of power source and the current passing through the AC current limiting circuit device (Z10), for controlling the turn-on phase angle of the solid-state switch device for controlling AC conductivity phase angle (1000) is controlled, so as to regulate the voltage and current passing through the solid-state light emitting member;

The illumination waveform and current waveform diagrams obtained during the operation disclosed in the embodiment illustrated in FIG. 4 are the same as what is disclosed in FIG. 2.

Figure 5:
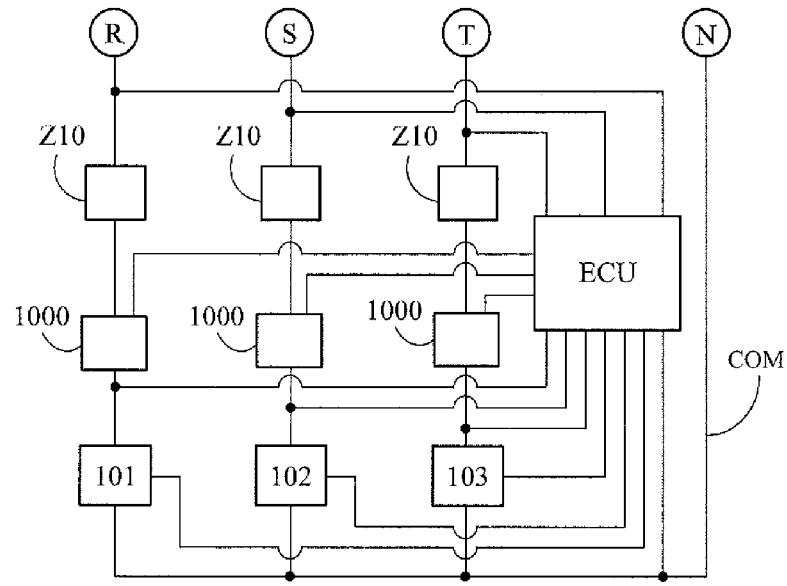
FIG. 5 is a circuit schematic view of utilizing a three-phase four-wire AC power source and each phase power being regulated by the solid-state switch device for controlling AC conductivity phase angle (1000) then respectively driving individual solid-state light emitting members connected in an Wye (Y) format and arranged adjacently or arranged with an overlapping means.

FIG. 5 is a circuit schematic view of utilizing a three-phase four-wire AC power source and each phase power being regulated by the solid-state switch device for controlling AC conductivity phase angle (1000) then respectively driving individual solid-state light emitting members connected in an Wye (Y) format and arranged adjacently or arranged with an overlapping means; as shown in FIG. 5, mainly consists of:

AC solid-state light emitting member (101), (102), (103): constituted by two or more than two AC-power driven solid-state light emitting members, including a light emitting diode (LED) or an organic light emitting diode (OLED) provided as a foundational light emitting member for being driven by AC power source, or including other solid-state light emitting member capable of being driven by AC power source constituted by two or more than two AC-power driven solid-state light emitting members, including a light emitting diode (LED) or an organic light emitting diode (OLED) provided as a foundational light emitting member for being driven by AC power source, or including other solid-state light emitting member capable of being driven by AC power source;

The AC-power driven solid-state light emitting member (101), the AC-power driven solid-state light emitting member (102) and the AC-power driven solid-state light emitting member (103) are connected in the Wye (Y) format at the common connection end (COM), and connected to the neutral wire (N) of the three-phase four-wire AC power source;

The non-common connection end of the AC-power driven solid-state light emitting member (101) is connected in series with the AC current limiting circuit device (Z10) and connected in series with the solid-state switch device for controlling AC conductivity phase angle (1000), and after the series connection, one end thereof is connected to the three-phase four-wire AC power wire (R);

The non-common connection end of the AC-power driven solid-state light emitting member (102) is connected in series with the AC current limiting circuit device (Z10) and connected in series with the solid-state switch device for controlling AC conductivity phase angle (1000), and after the series connection, one end thereof is connected to the three-phase four-wire AC power wire (S);

The non-common connection end of the AC-power driven solid-state light emitting member (103) is connected in series with the AC current limiting circuit device (Z10) and connected in series with the solid-state switch device for controlling AC conductivity phase angle (1000), and after the series connection, one end thereof is connected to the three-phase four-wire AC power wire (T);

AC current limiting circuit device (Z10): constituted by one or more than one of the following circuit structures, including:

1) Regulating the driving current of the AC solid-state light emitting member (LED) by increasing/decreasing the reactive power conductivity angle controlled by the solid-state switch device for controlling AC conductivity phase angle (1000);

2) One or more than one of resistant type impedance member, induction type impedance member or capacitor type impedance member being connected in series, in parallel or in series and parallel;

3) The control circuit structured by a solid-state semiconductor circuit which performs analog or chopper type constant current or limiting current to the solid-state light emitting member;

4) AC stabilizing transformer;

5) AC constant current output transformer;

Solid-state switch device for controlling AC conductivity phase angle (1000): constituted by one or more than one of the following circuit structures:

1) A thyristor power component capable of controlling conductivity phase angle, for example TRIAC (Tri-Electrode AC Switch), SCR (Silicon Controlled Rectifier) or GTO (Gate Turn-off Thyristor) serving as an active component, and through the operations of the voltage comparison circuit between each phase voltage from the each phase voltage detection circuit, the control timing of both or at least one of the turn-on phase angle and the turn-off phase angle of the thyristor component is enabled to be controlled;

2) A solid-state switch device composed of a filed effect power component, for example MOSFET (Metal Oxide Semiconductor Field Effect Transistor) or IGBT (Insulated Gate Bipolar Transistor) serving as the active component, and through the operations of the voltage comparison circuit between each phase voltage from the voltage detection circuit of multiphase power source, the driving circuit of the field effect component is controlled, so as to control the control timing of both or at least one of the turn-on phase angle and the turn-off phase angle of the field effect component;

3) With properties of the zener voltage of the zener diode, or with the voltage forward drop feature of the diode, the zener diode or the diode is connected in series between the gate of the thyristor and the voltage source, so as to set the control timing of both or at least one of the turn-on phase angle and the turn-off phase angle of the thyristor component during the power source performing the voltage variation in a sine waveform;

4) Through the voltage of the used AC power source, to set the operations of the turn-on phase angle and the turn-off phase angle of the solid-state light emitting member according to the voltage forward (VF) feature of the AC solid-state light emitting member itself (LED), during the power source performing the voltage variation in a sine waveform;

Electric power control unit (ECU): according to the internal setting of the electric control unit (ECU) or receiving external controls, and referring to the voltage of power source and the current passing through the AC current limiting circuit device (Z10), for controlling the turn-on phase angle of the solid-state switch device for controlling AC conductivity phase angle (1000) is controlled, so as to regulate the voltage and current passing through the solid-state light emitting member;

The illumination waveform and current waveform diagrams obtained during the operation disclosed in the embodiment illustrated in FIG. 5 are the same as what is disclosed in FIG. 2.

Figure 6:
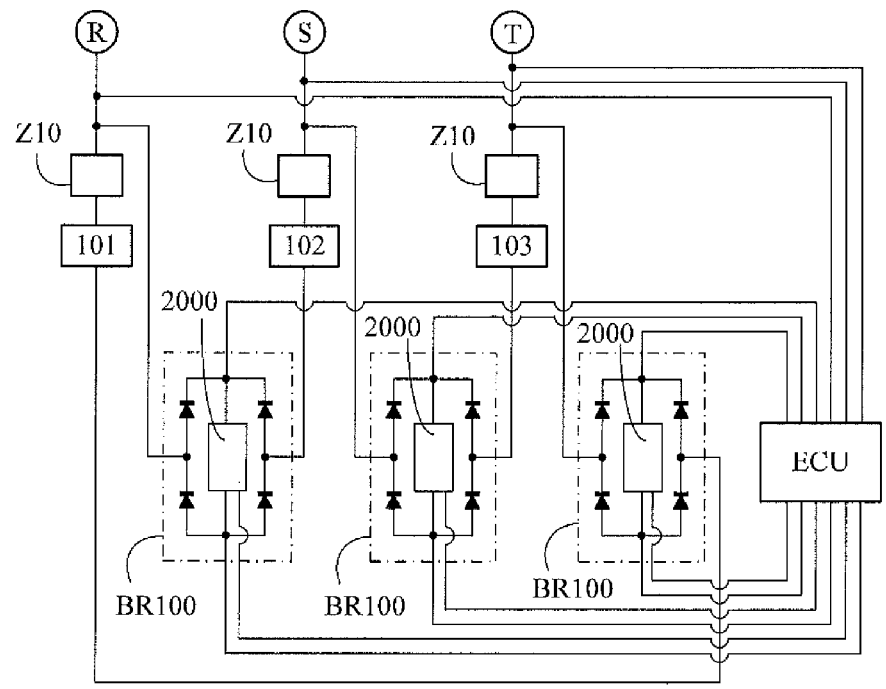
FIG. 6 is the circuit schematic view in which each phase of the three-phase AC power source being individually connected in parallel to a circuit device in series connected by the AC current limiting circuit device (Z10), the AC solid-state light emitting member and the AC terminal of single-phase bridge rectifier (BR100), then the DC output terminal of each phase of single-phase bridge rectifier (BR100) being homo-polar connected in parallel with the solid-state switch device for controlling electric conduction phase angle (2000).

FIG. 6 is the circuit schematic view in which each phase of the three-phase AC power source being individually connected in parallel with a circuit device in series connected by the AC current limiting circuit device (Z10), the AC solid-state light emitting member and the AC terminal of single-phase bridge rectifier (BR100), then the DC output terminal of the single-phase bridge rectifier (BR100) of each phase being homo-polar connected in parallel with the solid-state switch device for controlling electric conduction phase angle (2000), as shown in FIG. 6, it mainly consists of:

AC solid-state light emitting member (101), (102), (103): constituted by two or more than two AC-power driven solid-state light emitting members, including a light emitting diode (LED) or an organic light emitting diode (OLED) provided as a foundational light emitting member for being driven by AC power source, or including other solid-state light emitting member capable of being driven by AC power source;

The solid-state light emitting member (101) driven by AC power is in series connected to the AC current limiting circuit device (Z10) and in series connected to the AC terminal of single-phase bridge rectifier (BR100), then connected in parallel between the three-phase AC power wire (R) and the three-phase AC power wire (T);

The solid-state light emitting member (102) driven by AC power is in series connected to the AC current limiting circuit device (Z10) and in series connected to the AC terminal of single-phase bridge rectifier (BR100), then connected in parallel between the three-phase AC power wire (S) and the three-phase AC power wire (R);

The solid-state light emitting member (103) driven by AC power is in series connected to the AC current limiting circuit device (Z10) and in series connected to the AC terminal of single-phase bridge rectifier (BR100), then connected in parallel between the three-phase AC power wire (T) and the three-phase AC power wire (S);

AC current limiting circuit device (Z10): constituted by one or more than one of the following circuit structures, including:

1) Regulating the driving current of the AC solid-state light emitting member (LED) by increasing/decreasing the reactive power conductivity angle controlled by the solid-state switch device for controlling AC conductivity phase angle (1000);

2) One or more than one of resistant type impedance member, induction type impedance member or capacitor type impedance member being connected in series, in parallel or in series and parallel;

3) The control circuit structured by a solid-state semiconductor circuit which performs analog or chopper type constant current or limiting current to the solid-state light emitting member;

4) AC stabilizing transformer;

5) AC constant current output transformer;

Solid-state switch device for controlling electric conduction phase angle (2000): connected in parallel between the positive and negative terminals of each set of single-phase bridge rectifier (BR100), controlled by the electric power control unit (ECU) for performing regulation of conducting phase angle, and the solid-state switch for controlling electric conduction phase angle (2000) is constituted by one or more than one of the following electric circuit structures:

1) A thyristor power component capable of controlling conductivity phase angle, for example TRIAC (Tri-Electrode AC Switch), SCR (Silicon Controlled Rectifier) or GTO (Gate Turn-off Thyristor) serving as an active component, and through the operations of the voltage comparison circuit between each phase voltage from the each phase voltage detection circuit, the control timing of both or at least one of the turn-on phase angle and the turn-off phase angle of the thyristor component is enabled to be controlled;

2) A solid-state switch device composed of a filed effect power component, for example MOSFET (Metal Oxide Semiconductor Field Effect Transistor) or IGBT (Insulated Gate Bipolar Transistor) serving as the active component, and through the operations of the voltage comparison circuit between each phase voltage from the voltage detection circuit of multiphase power source, the driving circuit of the field effect component is controlled, so as to control the control timing of both or at least one of the turn-on phase angle and the turn-off phase angle of the field effect component;

3) With properties of the zener voltage of the zener diode, or with the voltage forward drop feature of the diode, the zener diode or the diode is connected in series between the gate of the thyristor and the voltage source, so as to set the control timing of both or at least one of the turn-on phase angle and the turn-off phase angle of the thyristor component during the power source performing the voltage variation in a sine waveform;

4) Through the voltage of the used AC power source, to set the operations of the turn-on phase angle and the turn-off phase angle of the solid-state light emitting member according to the voltage forward (VF) feature of the AC solid-state light emitting member itself (LED), during the power source performing the voltage variation in a sine waveform;

Electric power control unit (ECU): according to the internal setting of the electric control unit (ECU) or receiving external controls, and referring to the voltage of three-phase AC power source and the current passing through the AC current limiting circuit device (Z10), for controlling the turn-on phase angle of the solid-state switch device for controlling electric conduction phase angle (2000) connected in parallel between the positive and negative terminals of each set of single-phase bridge rectifier (BR100), so as to regulate the voltage and current passing through the solid-state light emitting member;

The illumination waveform and current waveform diagrams obtained during the operation disclosed in the embodiment illustrated in FIG. 6 are the same as what is disclosed in FIG. 2.

Figure 7:
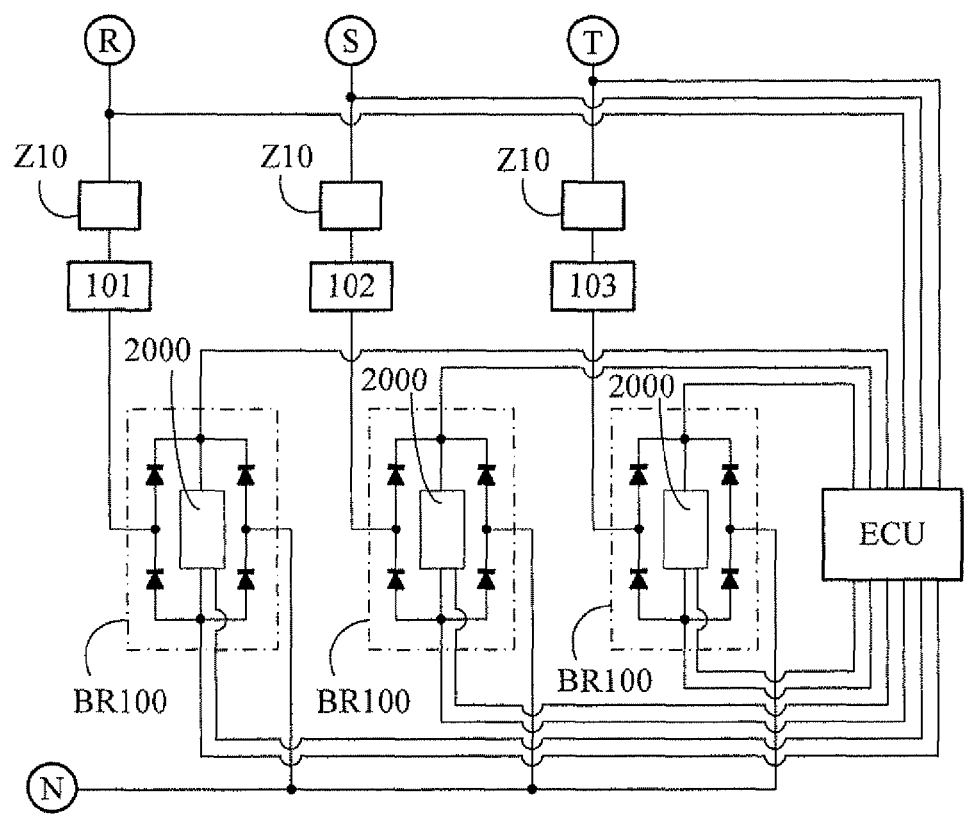
FIG. 7 is the circuit schematic view in which a circuit device in series connected by the AC current limiting circuit device (Z10), the AC solid-state light emitting member and the AC terminal of single-phase bridge rectifier (BR100) being individually installed in parallel between each phase of R, S, and T of three-phase four-wire AC power source and the neutral wire of three-phase four-wire AC power source (N), then the DC output terminal of each phase of single-phase bridge rectifier (BR100) being homo-polar connected in parallel with the solid-state switch device for controlling electric conduction phase angle (2000).

FIG. 7 is the circuit schematic view in which a circuit device in series connected by the AC current limiting circuit device (Z10), the AC solid-state light emitting member and the AC terminal of single-phase bridge rectifier (BR100) being individually installed in parallel between each phase of R, S, and T of three-phase four-wire AC power source and the neutral wire of three-phase four-wire AC power source (N), then the DC output terminal of the single-phase bridge rectifier (BR100) of each phase being homo-polar connected in parallel with the solid-state switch device for controlling electric conduction phase angle (2000); as shown in FIG. 7, it mainly consists of:

AC solid-state light emitting member (101), (102), (103): constituted by two or more than two AC-power driven solid-state light emitting members, including a light emitting diode (LED) or an organic light emitting diode (OLED) provided as a foundational light emitting member for being driven by AC power source, or including other solid-state light emitting member capable of being driven by AC power source;

The AC current limiting circuit device (Z10) is in series connected to the solid-state light emitting member (101), and in series connected to the AC terminal of single-phase bridge rectifier (BR100), then connected in parallel between the three-phase four-wire AC power wire (R) and the neutral wire of three-phase four-wire AC power source (N);

The AC current limiting circuit device (Z10) is in series connected to the solid-state light emitting member (102), and in series connected to the AC terminal of single-phase bridge rectifier (BR100), then connected in parallel between the three-phase four-wire AC power wire (S) and the neutral wire of three-phase four-wire AC power source (N);

The AC current limiting circuit device (Z10) is in series connected to the solid-state light emitting member (103), and in series connected to the AC terminal of single-phase bridge rectifier (BR100), then connected in parallel between the three-phase four-wire AC power wire (T) and the neutral wire of three-phase four-wire AC power source (N);

AC current limiting circuit device (Z10): constituted by one or more than one of the following circuit structures, including:

1) Regulating the driving current of the AC solid-state light emitting member (LED) by increasing/decreasing the reactive power conductivity angle controlled by the solid-state switch device for controlling AC conductivity phase angle (1000);

2) One or more than one of resistant type impedance member, induction type impedance member or capacitor type impedance member being connected in series, in parallel or in series and parallel;

3) The control circuit structured by a solid-state semiconductor circuit which performs analog or chopper type constant current or limiting current to the solid-state light emitting member;

4) AC stabilizing transformer;

5) AC constant current output transformer;

Solid-state switch device for controlling electric conduction phase angle (2000): connected in parallel between the positive and negative terminals of each set of single-phase bridge rectifier (BR100), controlled by the electric power control unit (ECU) for performing regulation of conducting phase angle, and the solid-state switch for controlling electric conduction phase angle (2000) is constituted by one or more than one of the following electric circuit structures:

1) A thyristor power component capable of controlling conductivity phase angle, for example TRIAC (Tri-Electrode AC Switch), SCR (Silicon Controlled Rectifier) or GTO (Gate Turn-off Thyristor) serving as an active component, and through the operations of the voltage comparison circuit between each phase voltage from the each phase voltage detection circuit, the control timing of both or at least one of the turn-on phase angle and the turn-off phase angle of the thyristor component is enabled to be controlled;

2) A solid-state switch device composed of a filed effect power component, for example MOSFET (Metal Oxide Semiconductor Field Effect Transistor) or IGBT (Insulated Gate Bipolar Transistor) serving as the active component, and through the operations of the voltage comparison circuit between each phase voltage from the voltage detection circuit of multiphase power source, the driving circuit of the field effect component is controlled, so as to control the control timing of both or at least one of the turn-on phase angle and the turn-off phase angle of the field effect component;

3) With properties of the zener voltage of the zener diode, or with the voltage forward drop feature of the diode, the zener diode or the diode is connected in series between the gate of the thyristor and the voltage source, so as to set the control timing of both or at least one of the turn-on phase angle and the turn-off phase angle of the thyristor component during the power source performing the voltage variation in a sine waveform;

4) Through the voltage of the used AC power source, to set the operations of the turn-on phase angle and the turn-off phase angle of the solid-state light emitting member according to the voltage forward (VF) feature of the AC solid-state light emitting member itself (LED), during the power source performing the voltage variation in a sine waveform;

Electric power control unit (ECU): according to the internal setting of the electric control unit (ECU) or receiving external controls, and referring to the voltage of three-phase four-wire AC power source and the current passing through the AC current limiting circuit device (Z10), for controlling the turn-on phase angle of the solid-state switch device for controlling electric conduction phase angle (2000) connected in parallel between the positive and negative terminals of each set of single-phase bridge rectifier (BR100), so as to regulate the voltage and current passing through the solid-state light emitting member;

The illumination waveform and current waveform diagrams obtained during the operation disclosed in the embodiment illustrated in FIG. 7 are the same as what is disclosed in FIG. 2.

In the solid-state light emitting member having controllable multiphase reactive power, when the AC solid-state light emitting members (101), (102), (103) are structured by light emitting diodes (LEDs) or organic light emitting diodes (OLEDs), including one or more than one of the following means:

1) two or more than two light emitting diodes (LEDs) or organic light emitting diodes (OLEDs) is reverse-polarity connected in parallel; or 2) two or more than two light emitting diodes (LEDs) or organic light emitting diodes (OLEDs) is reverse-polarity connected in series then respectively reverse-polarity connected in parallel with diodes; or 3) one or more than one light emitting diodes (LEDs) or organic light emitting diodes (OLEDs) is connected in series, or in parallel or in series and parallel and normal-polarity connected to an DC output end of a bridge rectifying device.

In the solid-state light emitting member having controllable multiphase reactive power, when the AC solid-state light emitting members (101), (102), (103) are structured by single-way conductivity solid-state light emitting members, including one or more than one of the following means 1) two or more than two single-way conductivity solid-state light emitting members are reverse-polarity connected in parallel; or 2) two or more than two single-way conductivity solid-state light emitting members are reverse-polarity connected in series then respectively reverse-polarity connected in parallel with diodes; or 3) one or more than one single-way conductivity solid-state light emitting members are connected in series, or in parallel or in series and parallel and normal-polarity connected to a DC output end of a bridge rectifying device.

In the solid-state light emitting member having controllable multiphase reactive power, the AC solid-state light emitting members (101), (102), (103) are structured by one or more than one light emitting members in series connection, parallel connection or series and parallel connection, provided for being directly operated with an AC power source, so as to be directly operated with a AC power source.

According to the solid-state light emitting device having controllable multiplephase reactive power of the present invention, the mentioned multiplephase AC power source not only includes the three-phase power source adopted in aforesaid embodiments, the same theory and principle is also applicable in an AC power source having two or more than two phases.

The invention claimed is:

1. A solid-state light emitting device having controllable multiphase reactive power, which utilizes a three-phase AC power source, each power phase respectively driving individual solid-state light emitting members arranged adjacently or arranged with an overlapping means, so that the synthetic illumination brightness is overlapped through the illumination brightness waveforms generated by the AC power voltage of each phase, lowering the synthetic pulse rate of illumination brightness, and the sine waveform voltages at different phases between each power source enable the individual solid-state light emitting members respectively driven by each phase and arranged adjacently or arranged with an overlapping means generate optical energy having different brightnesses with respect to the instant value of the voltage waveform; such that when the individual solid-state light emitting members having different brightness and arranged adjacently or arranged with an overlapping means emit light, the power passing through the individual solid-state light emitting member having a relatively low brightness is defined as reactive power; the solid-state light emitting device having controllable multiphase reactive power that utilizes a solid-state switch device (2000) connected in parallel between positive and negative terminals of a respective single-phase bridge rectifier (BR100) to control an AC conductivity phase angle for controlling the reactive power to be cut so as to save power, and to further regulate the current and voltage supplied to the individual solid-state light emitting member; wherein each power phase of the three-phase AC power source is regulated by the solid-state switch device (2000) for controlling the AC conductivity phase angle and then respectively driving individual solid-state light emitting members connected in a delta (Δ) format and arranged adjacently or arranged with an overlapping means, the solid-state light emitting device comprising:

the AC solid-state light emitting member (101), (102), (103): constituted by two or more than two AC-power driven solid-state light emitting members, including a light emitting diode (LED) or an organic light emitting diode (OLED) provided as a foundational light emitting member for being driven by the AC power source, or including other solid-state light emitting members capable of being driven by the AC power source, wherein:

a first said AC-power driven solid-state light emitting member (101) is connected in series with an AC current limiting circuit device (Z10) and connected in series with the AC terminal of a first said single-phase bridge rectifier (BR100), and then connected in parallel between a first three-phase AC power wire (R) and a second three-phase AC power wire (S);

a second said AC-power driven solid-state light emitting member (102) is connected in series with the AC current limiting circuit device (Z10) and connected in series with AC terminal of a second said single-phase bridge rectifier (BR100), and then connected in parallel between the second three-phase AC power wire (S) and a third three-phase AC power wire (T);

a third said AC-power driven solid-state light emitting member (103) is connected in series with the AC current limiting circuit device (Z10) and connected in series with the AC terminal of a third said single-phase bridge rectifier (BR100), and then connected in parallel between the third three-phase AC power wire (T) and the first three-phase AC power wire (R);

the AC current limiting circuit device (Z10): constituted by one or more than one of the following circuit structures, including:
1) a current regulating circuit for regulating the driving current of the AC solid-state light emitting member (LED) by increasing/decreasing the reactive power conductivity angle controlled by the solid-state switch device (2000) for controlling the AC conductivity phase angle;
2) one or more than one of resistance type impedance members, induction type impedance members or capacitor type impedance members connected in series, in parallel, or in series and parallel;
3) a control circuit structured by a solid-state semiconductor circuit which performs analog or chopper type constant current or limiting current to the solid-state light emitting member;
4) an AC stabilizing transformer; and
5) an AC constant current output transformer;

the solid-state switch device (2000) for controlling the AC conductivity phase angle: connected in parallel between positive and negative terminals of each respective single-phase bridge rectifier (BR100) and constituted by one or more than one of the following circuit structures:
1) a thyristor power component capable of controlling conductivity phase angle, including at least one of a TRIAC (Tri-Electrode AC Switch), an SCR (Silicon Controlled Rectifier), a GTO (Gate Turn-off Thyristor), and another type of thyristor power component, the thyristors power component serving as an active component, such that through the operations of respective voltage comparison circuits for comparing respective voltage phases, the control timing of both or at least one of the turn-on phase angle and the turn-off phase angle of the thyristor component is enabled to be controlled;
2) a solid-state switch device composed of a field effect power component, including at least one of a MOSFET (Metal Oxide Semiconductor Field Effect Transistor), IGBT (Insulated Gate Bipolar Transistor), and another type of field effect power component, the field effect power component serving as the active component, such that through the operations of the voltage comparison circuits for comparing each voltage phase of the multiphase power source, the driving circuit of the field effect component is controlled, so as to control the control timing of both or at least one of the turn-on phase angle and the turn-off phase angle of the field effect component;
3) a zener diode or diode having a forward voltage drop feature connected in series between the gate of the thyristor and the voltage source, so as to set the control timing of both or at least one of the turn-on phase angle and the turn-off phase angle of the thyristor component during the power source performing the voltage variation in a sine waveform; and
4) a circuit for setting the operations of the turn-on phase angle and the turn-off phase angle of the solid-state light emitting member according to the voltage forward (VF) feature of the AC solid-state light emitting member itself (LED), as the power source performs the voltage variation in a sine waveform; and an electric power control unit (ECU): according to the internal setting of the electric control unit (ECU) or receiving external controls, and referring to the voltage of power source and the current passing through the AC current limiting circuit device (Z10), for controlling the turn-on phase angle of the solid-state switch device (2000) connected in parallel between positive and negative terminals of each respective single-phase bridge rectifier (BR100) for controlling the AC conductivity phase angle is controlled, so as to regulate the voltage and current passing through the solid-state light emitting member.

2. A solid-state light emitting device having controllable multiphase reactive power, which utilizes a three-phase, four line AC power source, and each phase power respectively drives individual solid-state light emitting members arranged adjacently or arranged with an overlapping means, so that the synthetic illumination brightness is overlapped through the illumination brightness waveforms generated by the AC power voltage of each phase, lowering the synthetic pulse rate of illumination brightness, and the sine waveform voltages at different phases enable the individual solid-state light emitting members respectively driven by each phase power and arranged adjacently or arranged with an overlapping means generate optical energy having different brightnesses with respect to the instant value of the voltage waveform; such that when the individual solid-state light emitting members having different brightness and arranged adjacently or arranged with an overlapping means emit light, the power passing through the individual solid-state light emitting member having a relatively low brightness is defined as reactive power; the solid-state light emitting device having controllable multiphase reactive power that utilizes a solid-state switch device (2000) connected in parallel between positive and negative terminals of a respective single-phase bridge rectifier (BR100) to control an AC conductivity phase angle for controlling the reactive power to be cut so as to save power, and to further regulate the current and voltage supplied to the individual solid-state light emitting member; wherein
 each power phase of the three-phase AC power source is regulated by the solid-state switch device (2000) for controlling the AC conductivity phase angle and then respectively driving individual solid-state light emitting members connected in a delta (Δ) format and arranged adjacently or arranged with an overlapping means, the solid-state light emitting device comprising:
 the AC solid-state light emitting member (101), (102), (103): constituted by two or more than two AC-power driven solid-state light emitting members, including a light emitting diode (LED) or an organic light emitting diode (OLED) provided as a foundational light emitting member for being driven by the AC power source, or including other solid-state light emitting members capable of being driven by the AC power source, wherein:
  a first said AC-power driven solid-state light emitting member (101) is connected in series with an AC current limiting circuit device (Z10) and connected in series with the AC terminal of a first said single-phase bridge rectifier (BR100), and then connected in parallel between a first three-phase AC power wire (R) and a neutral wire (N);
  a second said AC-power driven solid-state light emitting member (102) is connected in series with the AC current limiting circuit device (Z10) and connected in series with AC terminal of a second said single-phase bridge rectifier (BR100), and then connected in parallel between the second three-phase AC power wire (S) and a neutral wire (N);
  a third said AC-power driven solid-state light emitting member (103) is connected in series with the AC current limiting circuit device (Z10) and connected in series with the AC terminal of a third said single-phase bridge rectifier (BR100), and then connected in parallel between the third three-phase AC power wire (T) and a neutral wire (N);

the AC current limiting circuit device (Z10): constituted by one or more than one of the following circuit structures, including:
1) a current regulating circuit for regulating the driving current of the AC solid-state light emitting member (LED) by increasing/decreasing the reactive power conductivity angle controlled by the solid-state switch device (2000) for controlling the AC conductivity phase angle;
2) one or more than one of resistance type impedance members, induction type impedance members or capacitor type impedance members connected in series, in parallel, or in series and parallel;
3) a control circuit structured by a solid-state semiconductor circuit which performs analog or chopper type constant current or limiting current to the solid-state light emitting member;
4) an AC stabilizing transformer; and
5) an AC constant current output transformer;

the solid-state switch device (2000) for controlling the AC conductivity phase angle: connected in parallel between positive and negative terminals of each respective single-phase bridge rectifier (BR100) and constituted by one or more than one of the following circuit structures:
1) a thyristor power component capable of controlling conductivity phase angle, including at least one of a TRIAC (Tri-Electrode AC Switch), an SCR (Silicon Controlled Rectifier), a GTO (Gate Turn-off Thyristor), and another type of thyristor power component, the thyristors power component serving as an active component, such that through the operations of respective voltage comparison circuits for comparing respective voltage phases, the control timing of both or at least one of the turn-on phase angle and the turn-off phase angle of the thyristor component is enabled to be controlled;
2) a solid-state switch device composed of a field effect power component, including at least one of a MOSFET (Metal Oxide Semiconductor Field Effect Transistor), IGBT (Insulated Gate Bipolar Transistor), and another type of field effect power component, the field effect power component serving as the active component, such that through the operations of the voltage comparison circuits for comparing each voltage phase of the multiphase power source, the driving circuit of the field effect component is controlled, so as to control the control timing of both or at least one of the turn-on phase angle and the turn-off phase angle of the field effect component;
3) a zener diode or diode having a forward voltage drop feature connected in series between the gate of the thyristor and the voltage source, so as to set the control timing of both or at least one of the turn-on phase angle and the turn-off phase angle of the thyristor component during the power source performing the voltage variation in a sine waveform; and
4) a circuit for setting the operations of the turn-on phase angle and the turn-off phase angle of the solid-state light emitting member according to the voltage forward (VF) feature of the AC solid-state light emitting member itself (LED), as the power source performs the voltage variation in a sine waveform; and an electric power control unit (ECU): according to the internal setting of the electric control unit (ECU) or receiving external controls, and referring to the voltage of power source and the current passing through the AC current limiting circuit device (Z10), for controlling the turn-on phase angle of the solid-state switch device (2000) connected in parallel between positive and negative terminals of each respective single-phase bridge rectifier (BR100) for controlling the AC conductivity phase angle is controlled, so as to regulate the voltage and current passing through the solid-state light emitting member.

3. A solid-state light emitting device having controllable multiphase reactive power as claimed in claim 1 or 2, wherein when the AC solid-state light emitting members (101), (102), (103) are structured by light emitting diodes (LEDs) or organic light emitting diodes (OLEDs), including one or more than one of the following means:
1) two or more than two light emitting diodes (LEDs) or organic light emitting diodes (OLEDs) reverse-polarity connected in parallel; or
2) two or more than two light emitting diodes (LEDs) or organic light emitting diodes (OLEDs) reverse-polarity connected in series then respectively reverse-polarity connected in parallel with diodes; or
3) one or more than one light emitting diodes (LEDs) or organic light emitting diodes (OLEDs) connected in series, or in parallel or in series and parallel and normal-polarity connected to an DC output end of a bridge rectifying device.

4. A solid-state light emitting device having controllable multiphase reactive power as claimed in claim 1 or 2, wherein when the AC solid-state light emitting members (101), (102), (103) are structured by single-way conductivity solid-state light emitting members, including one or more than one of the following means:
1) two or more than two single-way conductivity solid-state light emitting members reverse-polarity connected in parallel; or
2) two or more than two single-way conductivity solid-state light emitting members reverse-polarity connected in series then respectively reverse-polarity connected in parallel with diodes; or
3) one or more than one single-way conductivity solid-state light emitting members connected in series, or in parallel or in series and parallel and normal-polarity connected to a DC output end of a bridge rectifying device.

* * * * *